United States Patent [19]

Lin

[11] Patent Number: 4,917,394
[45] Date of Patent: Apr. 17, 1990

[54] BICYCLE WITH AN ECCENTRIC REAR WHEEL

[76] Inventor: Fuh T. Lin, No. 6, Alley 10, Lane 73, Sec. 2, Chung Hsing Rd., 19 Lin, Tieh Shan Li, Ho Mei Chen, Chang Hwa Hsien, Taiwan

[21] Appl. No.: 344,694

[22] Filed: Apr. 28, 1989

[51] Int. Cl.⁴ .............................................. B62M 1/00
[52] U.S. Cl. ................................... 280/229; 280/288; 272/73; 301/105 R; 301/105 B; 301/111
[58] Field of Search ................... 280/229, 288; 272/73; 301/105 R, 105 B, 111, 5 R; 152/1, 5

[56] References Cited

U.S. PATENT DOCUMENTS

| 566,275 | 8/1896 | McIntire | 301/5 R |
| 883,746 | 4/1908 | Robbins | 280/229 |
| 985,369 | 2/1911 | Robbins | 280/229 |
| 3,817,120 | 6/1974 | Clay | 280/229 |

Primary Examiner—David M. Mitchell
Assistant Examiner—Anne Marie Boehler
Attorney, Agent, or Firm—Morton J. Rosenberg; David I. Klein

[57] ABSTRACT

A bicycle with an eccentric rear wheel including a inner rim with two plates set in parallel with each other across a diameter of the inner rim and an outer rim. A sleeve with a seat formed on it is provided around a hub of the eccentric wheel and serves to receive a shaft head extending from one end of a threaded shaft. The threaded shaft has a pinion on an end thereof opposite to said shaft head. Toothed blocks are slidably mounted on each seat stay to be engageable with the toothed pinion so as to cause the wheel to rotate more or less eccentrically about the hub.

1 Claim, 5 Drawing Sheets

BICYCLE WITH AN ECCENTRIC REAR WHEEL

BACKGROUND OF THE INVENTION

The present invention relates to a bicycle with an eccentric rear wheel, and more particularly relates to a bicycle with such an eccentric rear wheel enabling the rider to move up and down as if he were riding a horse.

In the past, bicycles were generally available for transportation rather than entertainment. However, owing to the changing world, it is popular to ride bicycles for both exercise and entertainment. Even so, conventional bicycles cannot provide excitement of riding. Therefore, people often like to ride horses, or look for excitement, such as soaring in the wind, but there is often no sufficient area available for horse riding.

In order to mitigate and/or obviate the abovementioned drawbacks, the present invention provides a novel bicycle as set forth in the detailed description of the preferred embodiment.

SUMMARY OF THE INVENTION

The primary objective of the present invention is to provide a bicycle with an eccentric rear wheel, in which the eccentric rear wheel enables the rider to move up and down as if he were riding a horse.

Another objective of the present invention is to provide a bicycle with an eccentric rear wheel, which is installed with a pinion to cause the rear wheel to rotate more or less eccentrically.

These and additional objectives, if not set forth specifically herein, will be readily apparent to those skilled in the art from the detailed description provided hereinbelow, with appropriate reference to the accompanying drawings.

DETAILED DESCRIPTION OF THE PREFERRED EMBODIMENT

Figure 1:
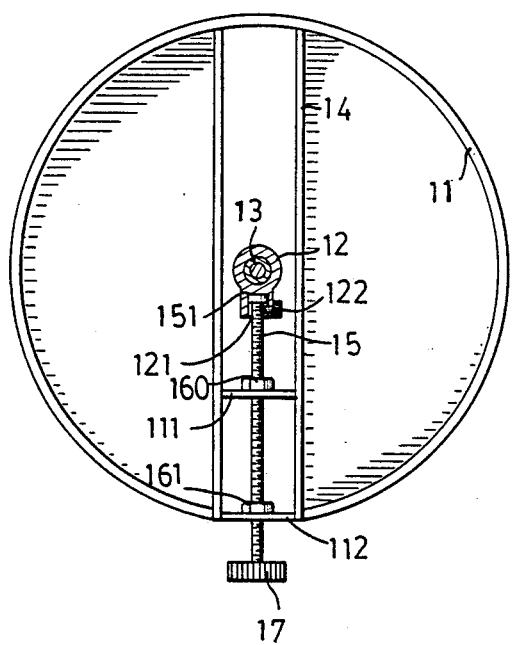
FIG. 1 is a detailed elevational view of an inner rim of an eccentric wheel in accordance with the present invention.
Figure 2:
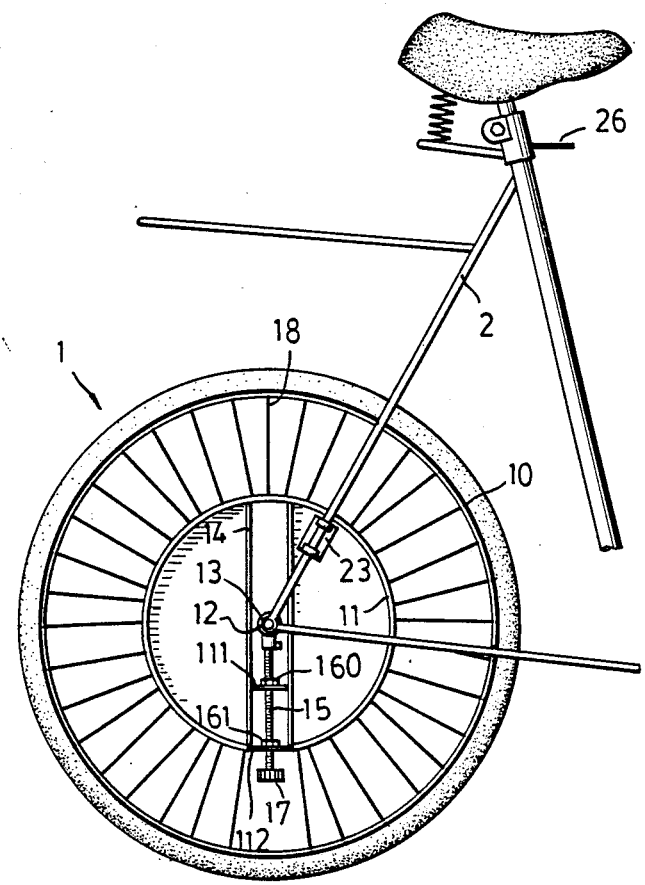
FIG. 2 is an elevational view of an eccentric rear wheel in accordance with the present invention, showing the toothed blocks in normal state.
Figure 3:
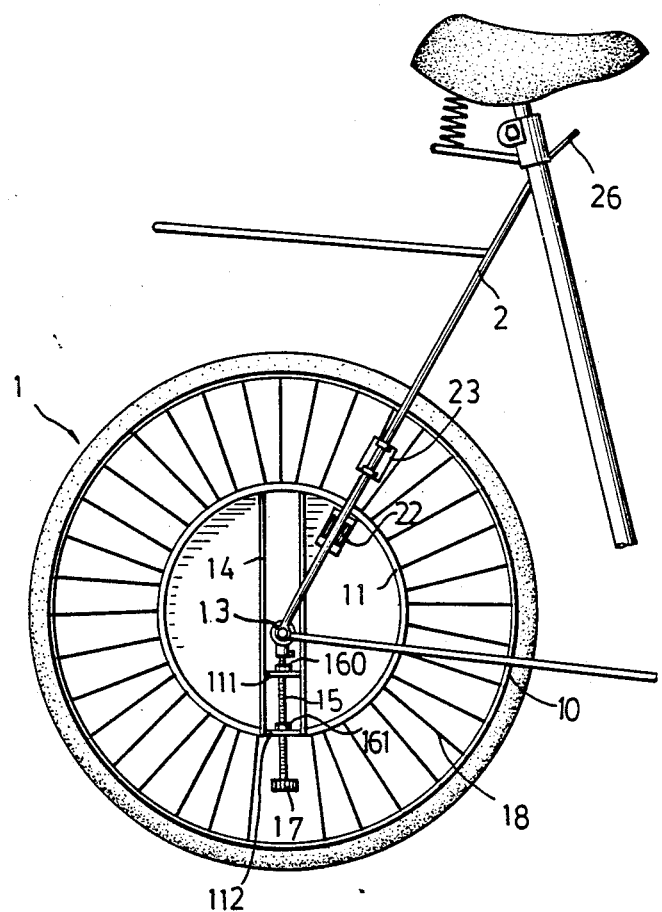
FIG. 3 is an elevational view of the eccentric rear wheel of FIG. 2, showing the shifter being pushed up so that one toothed block is shiftable upwards in position to be mountable with a toothed pinion.

Referring to FIGS. 1, 2 and 3, the present invention comprises an eccentric rear wheel 1, which is composed of an inner rim 11 with two plates 14 set in parallel with each other across a diameter of the inner rim 11 and an outer rim 10. The outer rim 10 and inner rim 11 are interconnected by a plurality of radially-oriented spokes 18 therebetween.

A sleeve 12 with a seat 121 formed thereon is provided around a hub 13 of the eccentric rear wheel and serves to receive a shaft head 151 extending from one end of a threaded shaft 15. The threaded shaft 15 is threadably positioned between the two plates 14 by two nuts 160 and 161 which are fixed between the two plates 14 and against two respective supporting means 111 and 112 which are positioned between the two plates 14 in appropriate position. Furthermore, the threaded shaft 15 has a toothed pinion 17 on an end thereof opposite to the shaft head 151.

Figure 4:
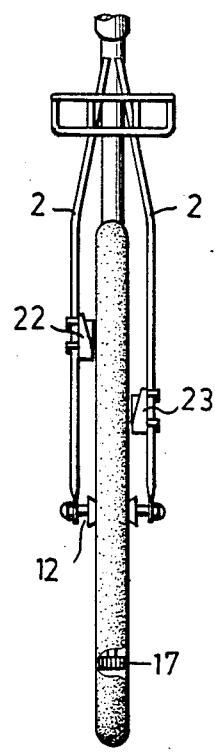
FIG. 4 is a rear side view of the wheel of FIG. 2, showing two toothed blocks mounted on the respective seat stays.
Figure 5:
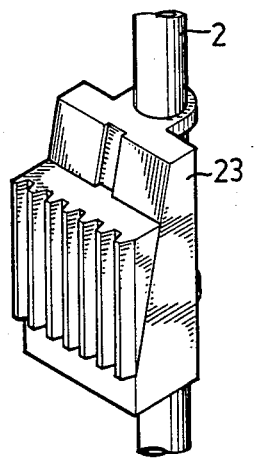
FIG. 5 is an enlarged view of a toothed block mounted on one of the seat stays.

Respective toothed blocks 22 and 23 are slidably mounted on each seat stay 2 (as shown in FIGS. 4 and 5) to be engageable with the toothed pinion 17. The toothed blocks 22 and 23, which are connected with a shifter 26 via a cable (not shown) as constructed in conventional manner, are slidable to adjust a relative position of the hub 13 with respect to the plates 14 by engaging with and rotating the pinion 17 so as to cause the wheel to rotate more or less eccentrically about the hub 13.

When the shifter 26 of the running bicycle is pushed up, one of the toothed blocks 22 or 23 is slidable upwards so as to be engageable with the toothed pinion 17, further rotating the threaded shaft 15 in one direction. In such a manner, the threaded shaft 15 causes the rear wheel to rotate more or less eccentrically. On the other hand, when the shifter 26 is pushed downwards, another toothed block will be slidable downwards to engage with the pinion 17 so as to rotate the threaded shaft 15 in opposite direction. In such a manner, the hub 13 of the eccentric rear wheel is returned to its original position, namely back to the center, that is, to a normal circular state.

While the present invention has been explained in relation to its preferred embodiment, it is to be understood that various modifications thereof will be apparent to those skilled in the art upon reading this specification. Therefore, it is to be understood that the invention disclosed herein is intended to cover all such modifications as fall within the scope of the appended claims.

I claim:

1. A bicycle having a frame, a seat, a front wheel, a couple of seat stays and a rear wheel, characterized in that:

said rear wheel has an inner rim with two plates set in parallel with each other across a diameter of said inner rim and an outer rim, a plurality of spokes being radially oriented between said inner rim and outer rim;

a sleeve with a seat formed thereon is provided around a hub of said eccentric wheel; said sleeve receiving a shaft head extending from one end of a threaded shaft, said threaded shaft being threadably positioned between said two plates by two nuts which are fixed between said two plates and against respective supporting means which are positioned between said two plates in appropriate position, said threaded shaft having a pinion on an end thereof opposite to said shaft head; and respective toothed blocks are slidably mounted on each seat stay to be engageable with said toothed pinion; said toothed blocks being slidable to adjust a relative position of said hub with respect to said plates by engaging with and rotating said pinion so as to cause said wheel to rotate more or less eccentrically about said hub.

* * * * *